United States Patent
Grundvig et al.

(10) Patent No.: US 8,049,982 B1
(45) Date of Patent: Nov. 1, 2011

(54) METHODS AND APPARATUS FOR MEASURING SERVO ADDRESS MARK DISTANCE IN A READ CHANNEL USING SELECTIVE FINE PHASE ESTIMATE

(75) Inventors: Jeffrey P. Grundvig, Loveland, CO (US); Viswanath Annampedu, Schnecksville, PA (US); Xun Zhang, Westford, MA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/847,676

(22) Filed: Jul. 30, 2010

(51) Int. Cl.
*G11B 5/09* (2006.01)
(52) U.S. Cl. ........................................ 360/50
(58) Field of Classification Search ............ 360/50, 360/29, 39, 40, 42, 43, 46, 48, 49, 51, 58, 360/67
See application file for complete search history.

(56) References Cited

U.S. PATENT DOCUMENTS

| | | | | |
|---|---|---|---|---|
| 4,405,952 A * | 9/1983 | Slakmon | | 360/49 |
| 4,451,819 A * | 5/1984 | Beckenhauer | | 341/59 |
| 4,580,178 A * | 4/1986 | Wuori et al. | | 360/67 |
| 5,255,127 A * | 10/1993 | Nakatsu et al. | | 360/29 |
| 5,293,276 A * | 3/1994 | Dunn et al. | | 360/51 |
| 5,321,558 A * | 6/1994 | Tackett | | 360/39 |
| 5,334,952 A | 8/1994 | Maddy et al. | | |
| 6,775,084 B1 | 8/2004 | Ozdemir et al. | | |
| 7,082,005 B2 | 7/2006 | Annampedu et al. | | |
| 7,286,313 B2 | 10/2007 | Erden et al. | | |
| 7,403,350 B2 * | 7/2008 | Bates et al. | | 360/29 |
| 7,408,729 B2 * | 8/2008 | Brooks et al. | | 360/39 |
| 7,508,611 B2 | 3/2009 | Buch et al. | | |
| 2003/0095350 A1 | 5/2003 | Annampedu et al. | | |
| 2006/0023602 A1 | 2/2006 | Rauschmayers | | |
| 2008/0266694 A1 | 10/2008 | Bliss et al. | | |
| 2010/0237863 A1* | 9/2010 | Stemmer | | 324/309 |
| 2011/0019302 A1* | 1/2011 | Aoki et al. | | 360/39 |

FOREIGN PATENT DOCUMENTS
KR 0417225 1/2004

OTHER PUBLICATIONS

Aziz et al., "Sysmbol Rate Timing Recoery for Higher Order Partial Response Channels," IEEE Journal on Selected Areas in Communications. vol. 19, No. 4, pp. 635-648 (Apr. 2001).

* cited by examiner

*Primary Examiner* — Fred Tzeng
(74) *Attorney, Agent, or Firm* — Ryan, Mason & Lewis, LLP (57) ABSTRACT

Methods and apparatus are provided for measuring servo address mark distance in a read channel using selective fine phase estimates. A distance between servo address marks (SAMs) in servo data of a magnetic recording media can be computed by obtaining a count of a number of time intervals between SAM patterns; obtaining a plurality of fractional phase estimates; selecting at least one of the plurality of fractional phase estimates as a selected fractional phase estimate based on a selection criteria; and combining the count and the selected fractional phase estimate to compute the distance. The fractional phase estimates can include a first fractional phase estimate having a lower resolution and higher accuracy in the presence of frequency errors relative to a second fractional phase estimate and wherein the second fractional phase estimate has more resolution and lower accuracy in the presence of the frequency errors relative to the first fractional phase estimate. The selection criteria can comprise a frequency error threshold.

20 Claims, 10 Drawing Sheets

METHODS AND APPARATUS FOR MEASURING SERVO ADDRESS MARK DISTANCE IN A READ CHANNEL USING SELECTIVE FINE PHASE ESTIMATE

FIELD OF THE INVENTION

The present invention generally relates to techniques for use in magnetic recording systems and, more particularly, to techniques for measuring the distance between servo address marks in consecutive servo wedges in such magnetic recording systems.

BACKGROUND OF THE INVENTION

A read channel integrated circuit (IC) is one of the core electronic components in a modern magnetic recording system, such as a hard disk drive. A read channel converts and encodes data to enable the heads to write data to the disk drive and then read back the data accurately. The disks in a drive typically have many tracks on them. Each track typically consists of mostly user or "read" data sectors, as well as control or "servo" data sectors embedded between the read sectors. The servo sectors help to position the magnetic recording head on a track so that the information stored in the read sectors is retrieved properly.

The servo data format includes a servo address mark (SAM) that is typically the same pattern of bits for all servo sectors. In a Disk Locked Clock (DLC) system, the distance between the servo address marks in consecutive servo wedges, often referred to as the "SAM2SAM distance," is used to estimate and correct the frequency error of the sampling clock. The SAM2SAM distance is typically obtained using a counter that measures the number of time intervals between consecutive SAM patterns (and has a resolution that is equal to the sampling period, T). The precision of the SAM2SAM distance value is typically improved by concatenating the integer counter value with a fractional fine phase estimate that is based on phase information from the Phase Locked Loop (PLL) in the read channel (and has a sub-T resolution). This fine phase estimate, however, is prone to errors in the presence of large frequency offsets.

Thus, a need exists for improved techniques for measuring the SAM2SAM distance in magnetic recording systems, such as hard disk drives.

SUMMARY OF THE INVENTION

Generally, methods and apparatus are provided for measuring servo address mark distance in a read channel using selective fine phase estimates. According to one aspect of the invention, a distance between servo address marks (SAMs) in servo data of a magnetic recording media is computed by obtaining a count of a number of time intervals between SAM patterns; obtaining a plurality of fractional phase estimates; selecting at least one of the plurality of fractional phase estimates as a selected fractional phase estimate based on a selection criteria; and combining the count and the selected fractional phase estimate to compute the distance.

The fractional phase estimates can comprise, for example, a first fractional phase estimate having a lower resolution and higher accuracy in the presence of frequency errors relative to a second fractional phase estimate and wherein the second fractional phase estimate has more resolution and lower accuracy in the presence of the frequency errors relative to the first fractional phase estimate. In one embodiment, the fractional phase estimates comprise a settled phase of a Digital Phase Lock Loop (DPLL) and a SAM Found phase value (such as a selected phase from a plurality of interpolated phases).

The selection criteria can comprise, for example, a frequency error threshold. The count and the selected fractional phase estimate can be combined, for example, by adding the count and the selected fractional phase estimate.

It is to be understood that since writing data to, storing data in, and reading data from a magnetic recording medium may be considered a transmission channel (medium) that has an associated frequency response, the techniques of the present invention are more generally applicable to any digital transmission systems such that detection of digital data represented by a sequence of symbols, where each symbol may be made up of a group of bits, may be improved.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative magnetic recording system embodiment. However, it is to be understood that the present invention is not so limited. Rather, as will be evident, the techniques of the invention may be more generally applied to improve digital data detection in any data encoding system or more generally, in any digital transmission system, in the presence or absence of sampling phase incoherence.

The detailed description will first describe and illustrate an exemplary magnetic recording system employing a servo encoding system which may be modified to implement the techniques of the present invention. The detailed description will then describe and illustrate a magnetic recording system and associated techniques for use therein in accordance with embodiments of the present invention.

The present invention employs a plurality of fine phase estimates and selects a particular fine phase estimate to use for computing the SAM2SAM distance value based on one or more selection criteria, such as a frequency error threshold. The SAM2SAM distance computation techniques of the present invention are discussed below, primarily in conjunction with FIGS. 5-7.

Figure 1:
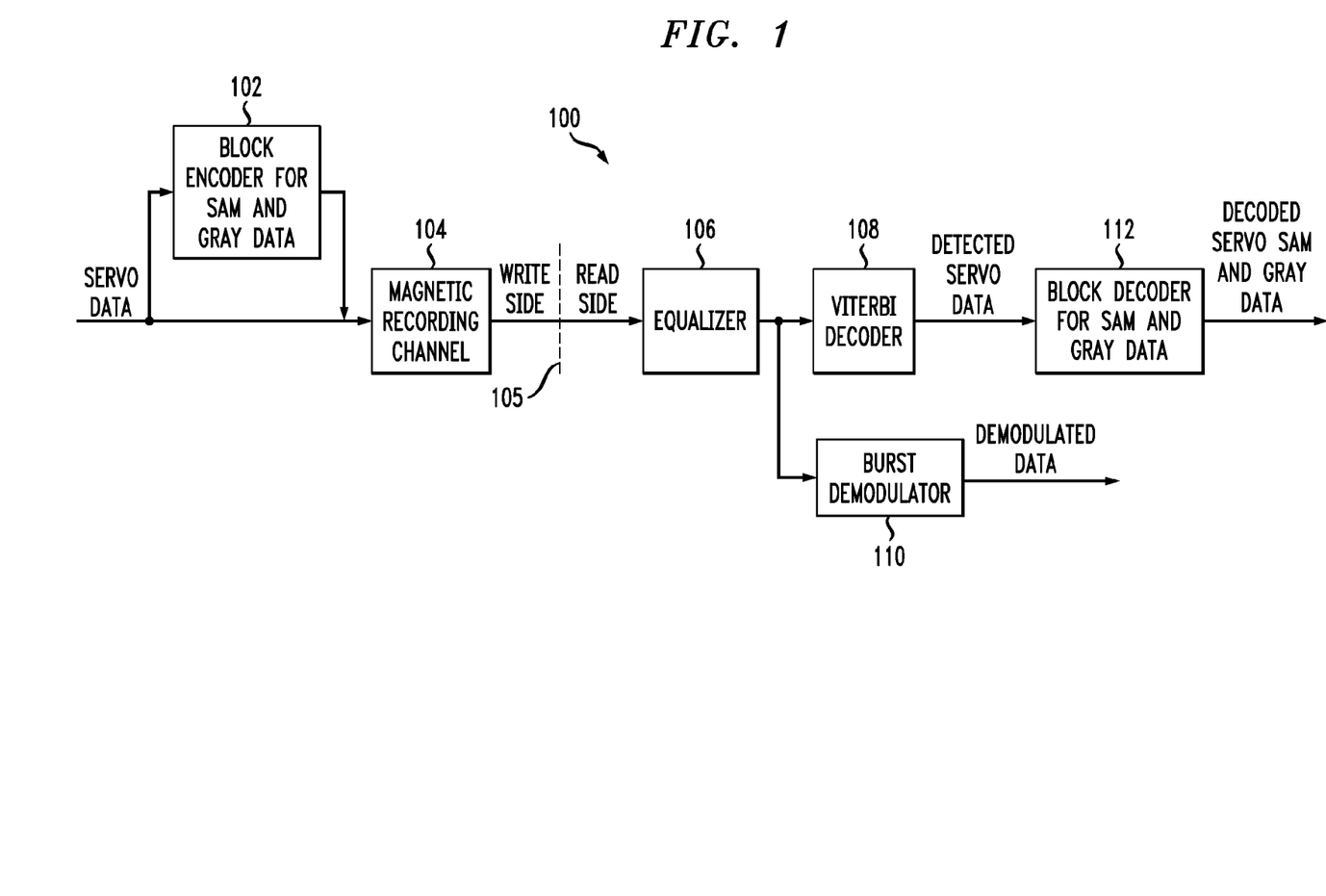
FIG. 1 is a block diagram illustrating an exemplary magnetic recording system which may be modified to implement the techniques of the present invention.

Referring initially to FIG. 1, an exemplary magnetic recording system is illustrated, particularly focusing on the components involved in servo data processing, which (as will be further explained and illustrated) may be modified to implement the techniques of the present invention. As shown, a magnetic recording system 100 may comprise a servo data block encoder 102, a magnetic recording channel 104, an equalizer 106, a Viterbi decoder 108, a burst demodulator 110, and a servo data block decoder 112. As is known, magnetic recording systems such as the one illustrated in FIG. 1 employ digital signal processing to detect servo data, as compared with older systems which employ analog techniques.

Figure 2:
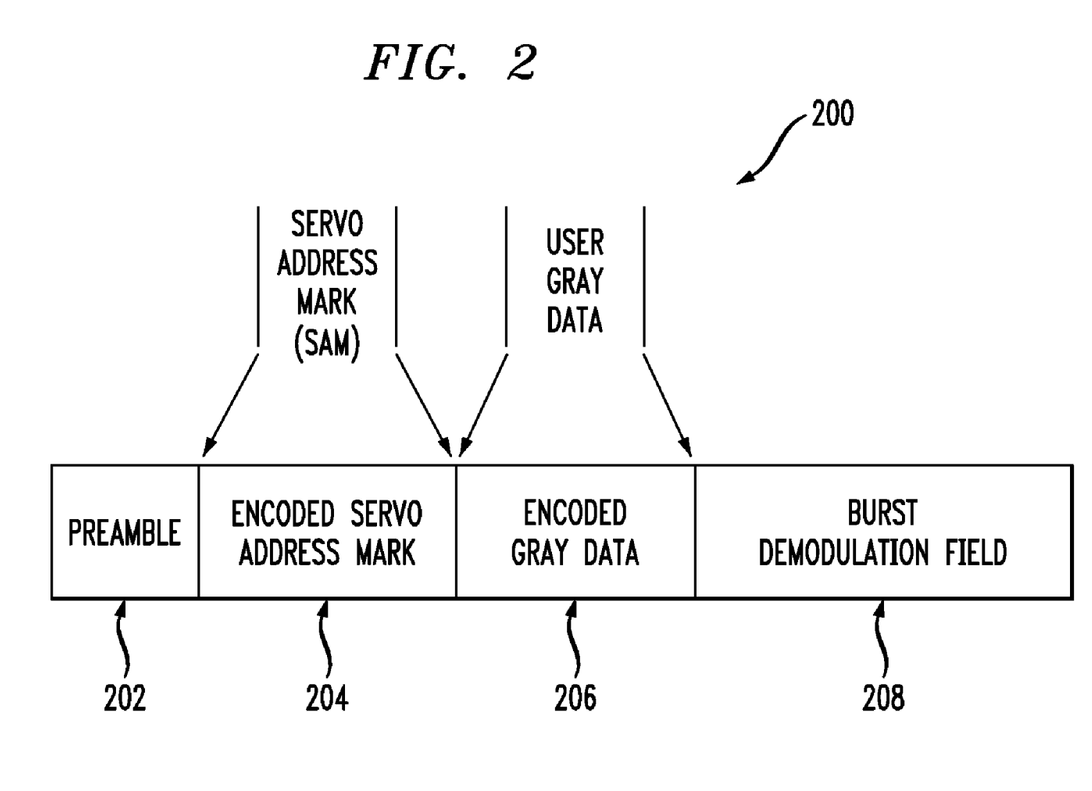
FIG. 2 is a diagram illustrating a servo data format.

FIG. 2 illustrates a data format 200 of a servo sector. As shown, a servo sector may comprise a servo preamble pattern 202 which allows the system to recover the timing and gain of the written servo data. The preamble is typically followed by a servo address mark (SAM) 204 which is the same for all servo sectors. The SAM is then followed by encoded servo Gray data 206. The Gray data is followed by one or more burst demodulation fields 208.

The SAM 204 typically comprises some fixed number of bits. The Gray data 206 represents the track number/cylinder information and serves as a coarse positioning for the magnetic head of the recording system. The burst demodulation fields 208 serve as a fine positioning system for the read head to be on track.

Thus, with reference back to FIG. 1, on the write side of operations, servo data is encoded by the block encoder 102 and written to a magnetic medium such as a disk (denoted as 105) via the magnetic recording channel 104. Portions of the servo data that are not encoded may also be written to the medium 105. It is understood that a magnetic write head, while not expressly shown, is functionally interposed between the magnetic recording channel 104 and the magnetic medium 105 for writing data to the medium. On the read side of operations, the servo data is read from the magnetic medium 105 via a magnetic read head (not expressly shown but understood to be functionally interposed between the medium 105 and the equalizer 106) and then equalized in accordance with the equalizer 106. The servo data is then sampled at a nominal sampling rate (not shown) and detected by the Viterbi decoder 108. The Gray data portion of the detected servo data is then decoded by the block decoder 112, while the burst demodulation field portion of the servo data is demodulated by the burst demodulator 110.

Servo Encoding

A servo encoder in a magnetic recording system may map M input bits to N output bits. Thus, one can make use of the constraints imposed by the servo encoder and attempt to design an optimal detector based on those constraints to decode the servo data. A partial response maximum likelihood (PRML) detector also known as a Viterbi decoder (e.g., Viterbi decoder 108 in FIG. 1) is a well-known, widely used detector for decoding the encoded servo data. Other detectors for servo data may include peak detectors where the location and polarity of the peak (which are dependent on servo encoder constraints) serve to decode the data. These detectors yield very good performance when they use properly sampled signals for detecting the bits. However, the performance of these detectors degrades significantly when the samples are taken with timing errors.

For example, an M/N servo data encoder of a magnetic recording system is described in U.S. Pat. No. 6,480,984, entitled "Rate (M/N) Code Encoder, Detector, and Decoder for Control Data," incorporated by reference herein.

Let us assume an EPR4 [5 5 −5 −5] partial response as a target response, and that M is 2 and N is 8. The ideal values (after equalization, sampling and digitizing) corresponding to the preamble, and the ⅔ encoded servo data are given below in Tables 1 and 2 for an EPR4 [5 5 −5 −5] target partial response. Note that these are the ideal sample values for 'T' symbol rate sampling of the equalized analog waveform.

TABLE 1

Preamble and corresponding A/D output stream
(Ideal Y Values)-EPR4 2/8

| Preamble | Y1 | Y2 | Y3 | Y4 |
|---|---|---|---|---|
| 11001100 | 0 | 20 | 0 | −20 |

TABLE 2

Data and corresponding A/D output
stream (Ideal Y Values)-EPR4 2/8

| Input bits | Coded bits | Y1 | Y2 | Y3 | Y4 | Y5 | Y6 | Y7 | Y8 |
|---|---|---|---|---|---|---|---|---|---|
| 00 | 00111100 | X | X | X | 20 | 10 | 0 | −10 | −20 |
| 11 | 11000011 | X | X | X | −20 | −10 | 0 | 10 | 20 |
| 01 | 00001111 | X | X | X | 0 | 10 | 20 | 10 | 0 |
| 10 | 11110000 | X | X | X | 0 | −10 | −20 | −10 | 0 |

In Table 2, X denotes that those values are dependent on the previous two input bits.

The preamble part of the servo field is used for acquiring the timing information by a digital phase lock loop (DPLL). After the preamble, the DPLL tracks the timing information during the servo data field. The ⅔ encoded SAM and Gray data is detected by a partial response maximum likelihood detector (Viterbi decoder) using the constraints imposed by the ⅔ encoder to improve reliability of the detected bits.

As described in the above-referenced U.S. Pat. No. 6,480,984, entitled "Rate (M/N) Code Encoder, Detector, and Decoder for Control Data," the relationship between the Viterbi trellis forcing phase sequence and the data stream has to be determined and initialized properly. Such a Viterbi trellis synchronization can be done easily by inserting a small number of pad bits between the preamble and SAM and detecting the end of the preamble. The end of the preamble can be detected simply and reliably by taking a filtered version of the received samples and performing a threshold detection on the filtered version.

As will be illustratively explained in detail below, the disclosed techniques employ interpolation to assist in choosing an optimum sampling phase associated with input data read from a magnetic recording medium. A servo channel employing a data detector such as a sequence detector or Viterbi detector needs to be synchronized to the block boundaries of the incoming data. Imperfect sampling can destroy this synchronization as well as corrupt the quality of the samples used for detection. The mis-synchronization to the block boundaries significantly affects the performance of the servo SAM detection.

Accordingly, one or more digital interpolators can be employed for generating samples at one or more time instances that fall between samples that correspond to time instances of the symbol rate. At the code word boundary (Nth bit for an M/N encoder), the inventive technique locks on to the best possible phase (optimum phase) based on the constraints imposed by the encoder and considers this phase as the best phase for the next code word boundary comparison. By way of example, at least three phases may be compared, e.g., at least one on either side of the best phase from the previous code word boundary. It is to be understood that decisions can be made on the samples while performing this phase selection or the interpolated samples corresponding to the best phase may be output to other signal processing circuitry and sophisticated detectors for making the decisions, thus enhancing performance even more.

The disclosed techniques offer several orders of magnitude in performance improvement in detecting SAM and Gray data and serves as a solution for next generation read channels. With appropriate modifications which may be realized by one skilled in the art given the inventive teachings herein, the techniques of the invention can be applied to any servo encoder.

Details of a digital interpolation based algorithm according to the invention will now be given. In a first embodiment, a ⅔ encoding technique (also referred to as CODE 1) is used to illustrate the techniques of the invention. By way of example only, a magnetic recording system which may be modified such that the techniques of the invention are implemented therein is described in the above-referenced U.S. Pat. No. 6,480,984, entitled "Rate (M/N) Code Encoder, Detector, and Decoder for Control Data." Implementation of the disclosed techniques with respect to other encoding systems will also be illustrated. For instance, implementations based on two other illustrative encoding techniques (referred to as CODE 2 and CODE 3) will also be provided below. However, it is to be understood that the invention is not limited to use with any particular encoding system or any transmission medium. Also, the following explanations will use the EPR4 target response and seven digital interpolators (as represented in Table 3 below) for the purposes of describing the invention. However, the invention is not limited to these illustrative parameters.

Shown in Table 3 are simple to implement digital interpolators (each embodied by a simple digital filter with four taps and a resolution of 1/16) which take the sampled signals at symbol rate and estimate samples in between the samples at symbol rate. It is to be appreciated that one interpolator is needed for each of the sampling points to be interpolated. Use of these interpolators on a T symbol rate signal results in interpolated values of very high accuracy (i.e., error variance is small) and can be easily implemented in digital processing circuitry. It is to be understood that the digital filters represented in Table 3 are for illustrative purposes only and, thus, the digital interpolators may be implemented in other embodiments with filters having other numbers of taps, other coefficient values, and other resolutions. Further, it is to be understood that the digital interpolators may be implemented by signal processing circuitry other than filters.

TABLE 3

Interpolators

| Interpolation at | Simple Digital Filters (Number of Taps: 4, Resolution: 1/16) | | | |
|---|---|---|---|---|
| T/8 | −1/16 | 2/16 | 15/16 | −1/16 |
| T/4 | −2/16 | 5/16 | 13/16 | −2/16 |
| 3T/8 | −2/16 | 7/16 | 11/16 | −2/16 |
| T/2 | −2/16 | 9/16 | 9/16 | −2/16 |
| 5T/8 | −2/16 | 11/16 | 7/16 | −2/16 |
| 3T/4 | −2/16 | 13/16 | 5/16 | −2/16 |
| 7T/8 | −1/16 | 15/16 | 2/16 | −1/16 |

Figure 3:
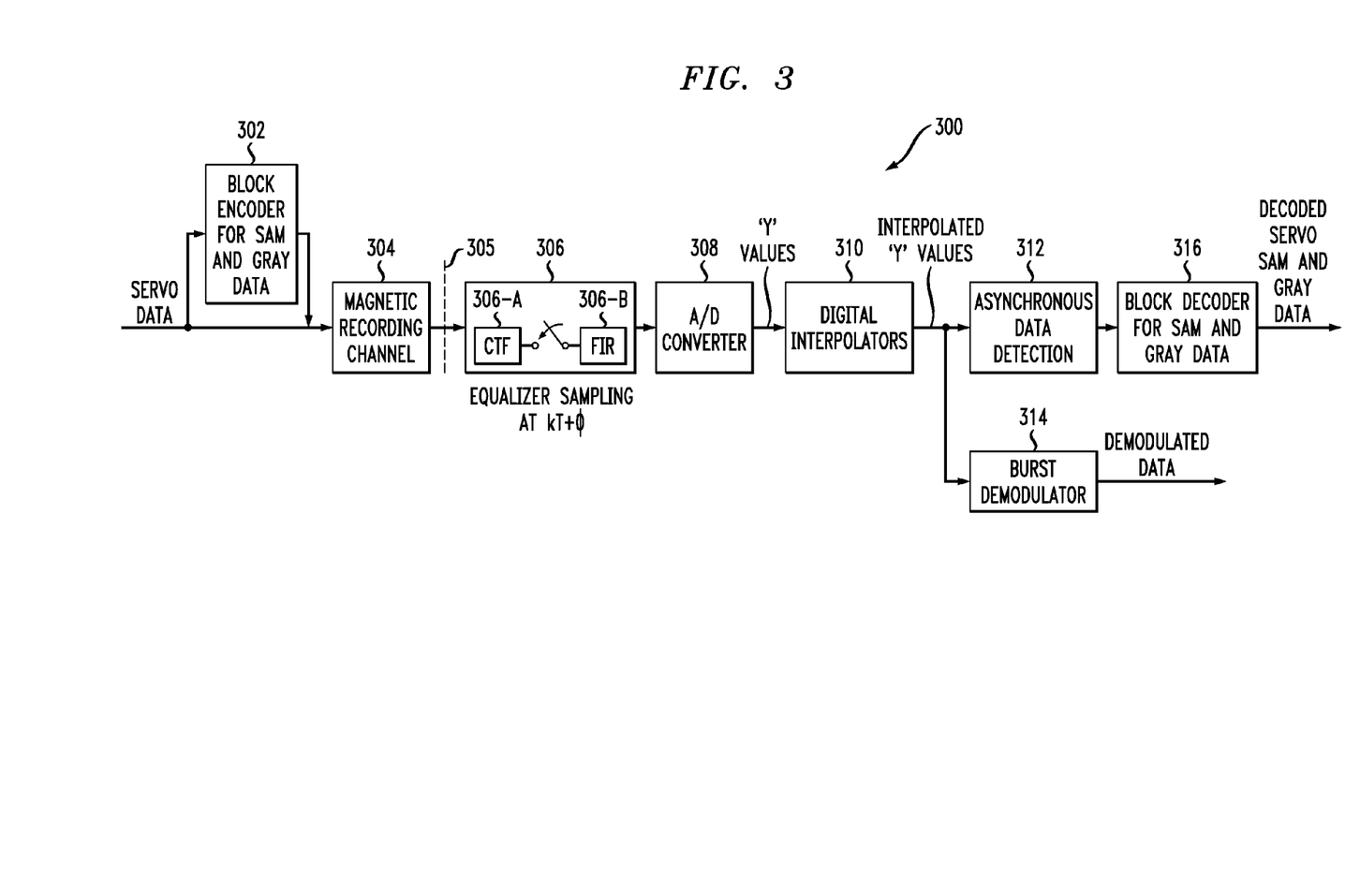
FIG. 3 is a block diagram illustrating a magnetic recording system according to an embodiment of the present invention.

Referring now to FIG. 3, a block diagram illustrates a magnetic recording system according to one embodiment of the present invention. It is to be understood that the system depicted in FIG. 3 is intended to illustrate the principles of the invention described above. Also, the system shown in FIG. 3 may be understood to, more broadly, represent a transmission system.

As shown, the magnetic recording system 300 comprises a servo data block encoder 302, a magnetic recording channel 304, an equalizer 306 with a continuous time filter (CTF) 306-A and a discrete time finite impulse response (FIR) filter 306-B, an analog-to-digital (A/D) converter 308, digital interpolators 310, an asynchronous data detector 312, a burst demodulator 314, and a servo data block decoder 316. It is assumed that the servo data has the same format as shown and described in the context of FIG. 2.

On the write side of operations, servo data is encoded by the block encoder 302 and written to a magnetic medium such as a disk (denoted as 305) via the magnetic recording channel 304. Encoding may be in accordance with a ⅔ encoding technique (CODE 1), with one of the other illustrative encoding techniques (CODE 2 or CODE 3), or with any other suitable encoding technique. Portions of the servo data that are not encoded may also be written to the medium 305. Again, it is understood that a magnetic write head, while not expressly shown, is functionally interposed between the magnetic recording channel 304 and the magnetic medium 305 for writing data to the medium.

On the read side of operations, the servo data is read from the magnetic medium 305 via a magnetic read head (not expressly shown but understood to be functionally interposed between the medium 305 and the equalizer 306) and then equalized in accordance with the equalizer 306. More specifically, a servo waveform corresponding to an encoded servo pattern is read back from the magnetic medium 305 and equalized by CTF 306-A and FIR filter 306-B, as is known.

The waveform is then digitized by the A/D converter 308, as is also known. The input to the A/D converter is a T symbol rate sampled target response equalized analog signal. It is to be understood that the techniques of the invention may be employed regardless of whether these T rate samples are asynchronously sampled or synchronously sampled with a conventional timing loop. The digital values at the output of the A/D converter are referred to as the 'Y' values. These symbol rate samples from the A/D converter ('Y' values) are then interpolated using the digital interpolators 310. As mentioned above, in one embodiment, there are seven digital interpolators, wherein the interpolators are implemented in accordance with Table 3 above. However, the invention is not limited to such a number, i.e., more or less digital interpolators may be employed.

The samples (interpolated 'Y' values) output by the digital interpolators 310 are then processed in an asynchronous manner in data detector 312 to detect the servo data. The block decoder 316 then decodes the detected data in accordance with the encoding technique implemented by the block encoder 302. The 'Y' values and/or the interpolated values are also used by the burst demodulator 314 to fine position the read head to be on track.

SAM2SAM Distance

Figure 4:
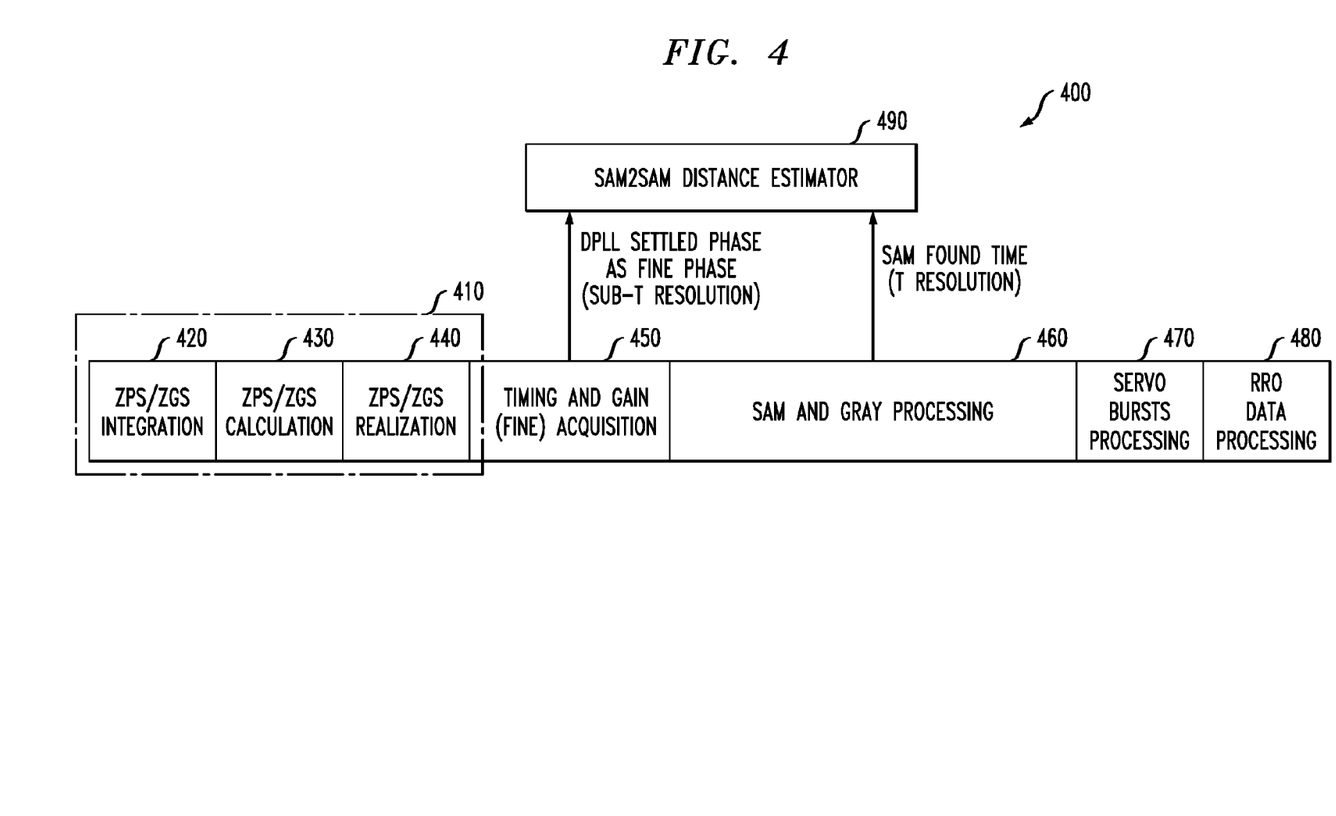
FIG. 4 illustrates a conventional technique for measuring the SAM2SAM distance during servo data processing.

As previously indicated, the SAM2SAM distance is used to estimate and correct the frequency error of the sampling clock. FIG. 4 illustrates a conventional technique 400 for measuring the SAM2SAM distance during servo data processing. As previously indicated, the servo data format 200 includes a preamble pattern 202 that is used to estimate the timing and gain information. Timing and gain estimation are typically performed in two steps. Initially, a coarse estimation 410 is performed using Discrete Fourier Transform (DFT) techniques. The coarse estimation 410 is followed by a fine estimation 450 using a more precise Zero Forcing (ZF) algorithm.

The conventional coarse estimation 410 estimates the timing using a Zero Phase Start (ZPS) technique and estimates the gain using a Zero Gain Start (ZGS) technique. For a detailed discussion of suitable ZPS and ZGS techniques, see for example, U.S. Pat. No. 7,529,320, incorporated by reference herein. As shown in FIG. 4, the conventional coarse estimation 410 integrates, calculates and realizes the timing and in estimates in three distinct steps 420, 430, 440, respectively.

The SAM and Gray data portions 204, 206 of the detected servo data are then processed during step 460 by the block decoder 112. In addition, the burst demodulation field portion 208 of the servo data is demodulated by the burst demodulator 110 during step 470 to fine position the read head to be on track.

The Repeatable Runout (RRO) data field is processed during step 480, in a known manner. Generally, the RRO data field (not shown in FIG. 2) includes head positioning information that is more precise than that provided by the encoded Gray data field and coarser than that provided by the burst demodulation field 216.

The SAM2SAM distance is typically obtained using a counter that measures the number of time intervals between consecutive SAM patterns, referred to as SAM Found Time and having a resolution that is equal to the sampling period, T. As shown in FIG. 4, the SAM2SAM distance value is calculated by a SAM2SAM distance estimator 490. The SAM2SAM distance estimator 490 typically improves the precision of the SAM2SAM distance value by concatenating the integer counter value (SAM Found Time) with a fractional fine phase estimate (DPLL Settled Phase) that is based on phase information from the Phase Locked Loop (PLL) in the read channel and has a sub-T resolution. The present invention recognizes that the DPLL Settled Phase estimate, however, is prone to errors in the presence of large frequency offsets.

Figure 5:
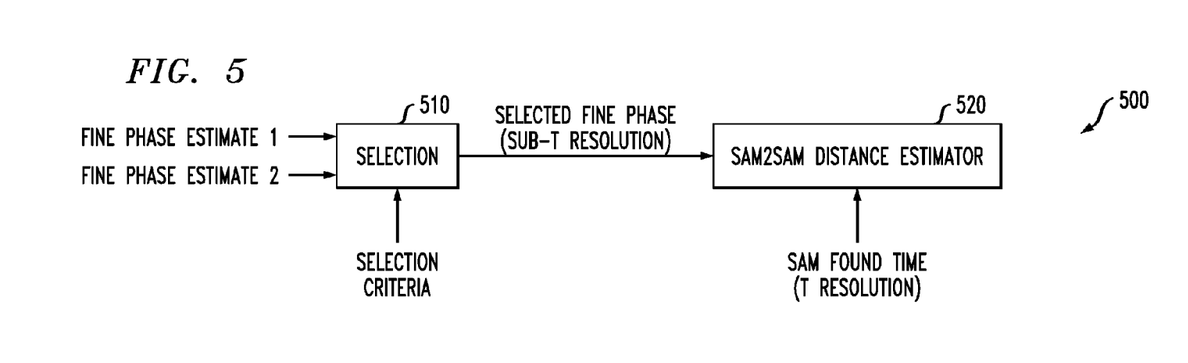
FIG. 5 is a schematic block diagram of an exemplary SAM2SAM distance estimator incorporating features of the present invention.

FIG. 5 is a schematic block diagram of an exemplary SAM2SAM distance estimator 500 incorporating features of the present invention. Generally, as shown in FIG. 5, the present invention employs a plurality of fine phase estimates and selects a particular fine phase estimate to use for computing the SAM2SAM distance value based on one or more selection criteria. As shown in FIG. 5, the exemplary SAM2SAM calculator 500 comprises a selection circuit 510 and a SAM2SAM distance estimator 520. The exemplary selection circuit 510 selects a first or second fine phase estimate based on a selection criteria. The SAM2SAM distance estimator 520 can be implemented in a similar manner as the SAM2SAM distance estimator 490 of the conventional approach. For example, the SAM2SAM distance estimator 520 can concatenate (e.g., by addition) the integer counter value (SAM Found Time) with the selected fractional fine phase estimate to generate the SAM2SAM distance.

One embodiment of the invention recognizes that the conventional DPLL Settled Phase estimate is prone to errors in the presence of large frequency offsets (e.g., when the DPLL cannot lock onto the frequency of the input signal). Generally, the DPLL does not settle to the correct value in the presence of large frequency errors. In this embodiment, a first fine phase estimate has less resolution but is more accurate in the presence of frequency errors, while the second fine phase estimate has more resolution but is error prone in the presence of frequency errors. Thus, in one embodiment, the selection criteria comprises a determination of whether the frequency error exceeds a predefined threshold. In this manner, an alternate fine phase estimate can be selected when the DPLL Settled Phase estimate is prone to error.

Figure 6:
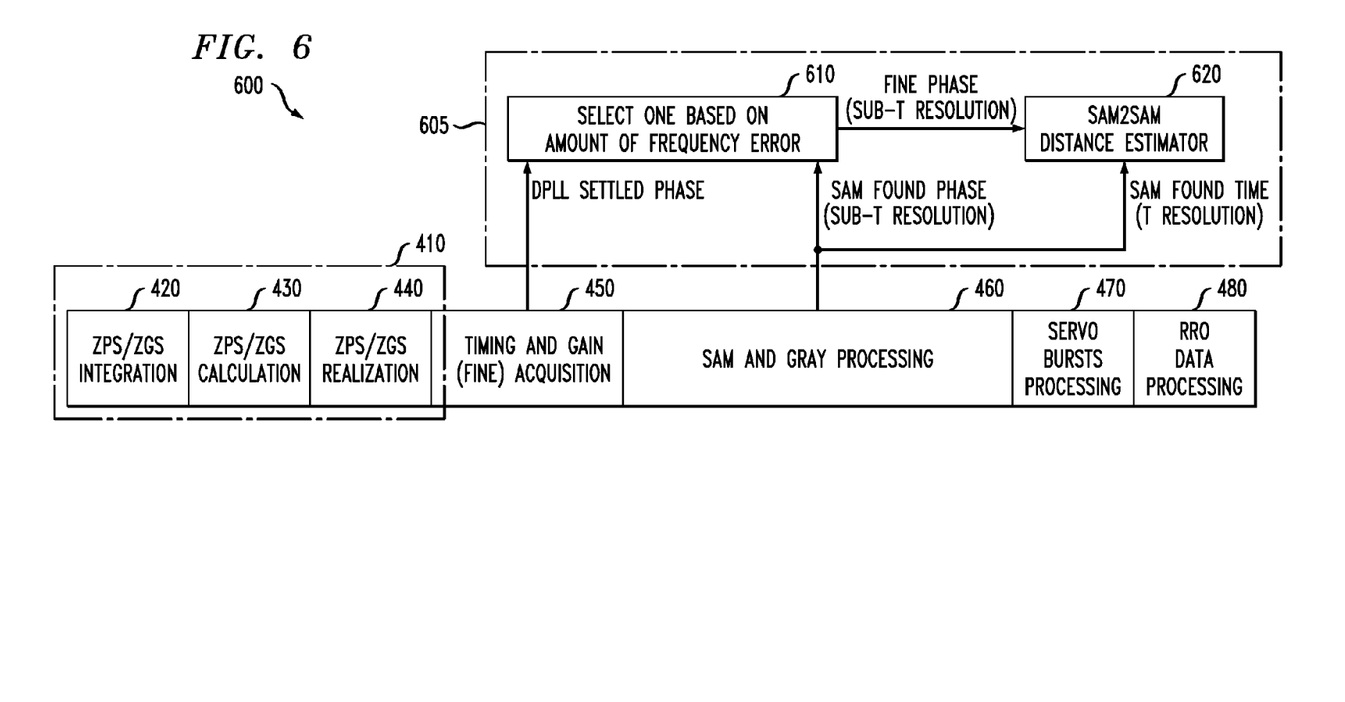
FIG. 6 illustrates a technique for measuring the SAM2SAM distance during servo data processing in accordance with one embodiment of the present invention.

FIG. 6 illustrates a technique 600 for measuring the SAM2SAM distance during servo data processing in accordance with one embodiment of the present invention. The servo data processing of FIG. 6 is based on the servo data processing of FIG. 4. Thus, the coarse estimation 410 integrates, calculates and realizes the timing and gain estimates in three distinct steps 420, 430, 440, respectively, in a similar manner to FIG. 4. Likewise, the SAM and Gray data portions 204, 206 of the detected servo data are then processed during step 460 by the block decoder 112. In addition, the burst demodulation field portion 208 of the servo data is demodulated by the burst demodulator 110 during step 470 to fine position the read head to be on track. Finally, the Repeatable Runout (RRO) data field is processed during step 480, in a known manner.

As shown in FIG. 6, the exemplary technique 600 employs a SAM2SAM calculator 605 that comprises a selection circuit 610 and a SAM2SAM distance estimator 620. In the embodiment of FIG. 6, the plurality of fine phase estimates selected by the selection circuit 610 comprise a DPLL Settled Phase estimate, in a similar manner to FIG. 4, as well as a SAM Found Phase in accordance with the present invention. It is again noted that the DPLL Settled Phase estimate has more resolution but is error prone in the presence of frequency errors. Likewise, the SAM Found Phase estimate has lower resolution but is more resilient in the presence of frequency errors. As discussed further below in a section entitled "SAM Found Phase," the SAM Found Phase provides sub-T resolution and is more robust to frequency errors. Generally, the SAM Found Phase can be based on the teachings of U.S. Pat. No. 7,082,005, incorporated by reference herein, where the fine phase estimate is based on the phase selected by the interpolator 310. In the embodiment of FIG. 6, the selection criteria employed by the selection circuit 610 is whether the frequency error exceeds a predefined threshold.

The SAM2SAM distance estimator 620 can be implemented in a similar manner to the conventional approach of FIG. 4.

Figure 7:
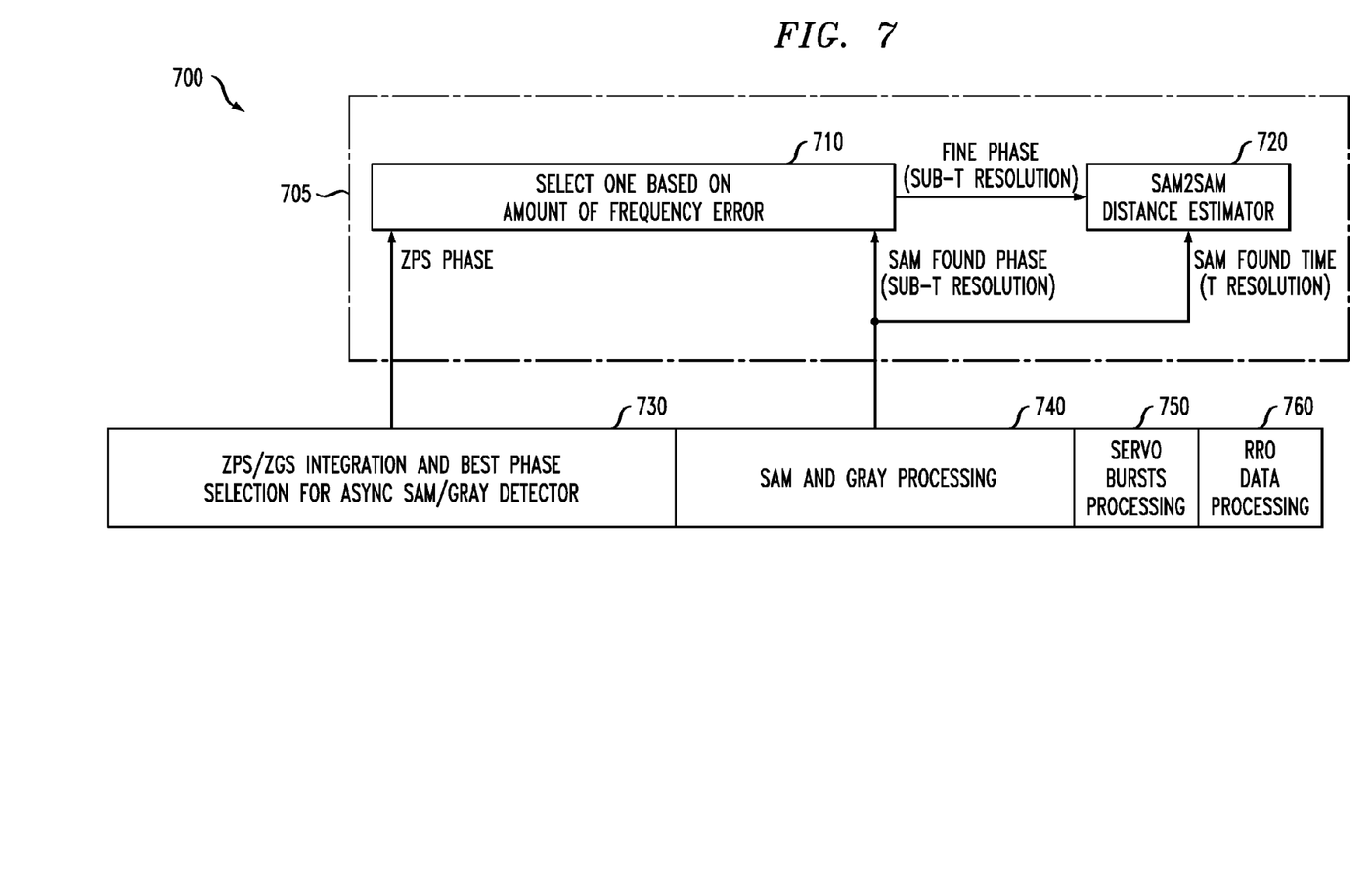
FIG. 7 illustrates an alternate technique for measuring the SAM2SAM distance during servo data processing in accordance with an alternate embodiment of the present invention.

FIG. 7 illustrates an alternate technique 700 for measuring the SAM2SAM distance during servo data processing in accordance with an alternate embodiment of the present invention. The embodiment of FIG. 7 can be used, for example, when there is no DPLL in the read channel. The servo data processing of FIG. 7 is based on the parallel servo data processing of U.S. patent application Ser. No. 12/847,661, entitled "Methods and Apparatus for Gain Estimation Using Servo Data With Improved Bias Correction," filed contemporaneously herewith and incorporated by reference herein. In the disclosed parallel servo data processing technique, a coarse estimate is initially obtained and used to process the SAM and Gray servo data fields 204, 206 while a fine gain estimate is obtained in parallel with the SAM/Gray processing.

As shown in FIG. 7, a coarse estimation 730 is performed using DFT-based ZPS and ZGS techniques. Although not shown in FIG. 7 for clarity of illustration of the present invention, the coarse estimate can optionally be used in parallel for SAM/Gray processing and to obtain the fine gain estimate required for burst demodulation processing. The samples used to compute the coarse timing and gain estimates can optionally be stored in a memory buffer. The SAM and Gray data portions 204, 206 of the detected servo data are then processed during step 740 by the block decoder 112 using the coarse timing and gain estimates computed during step 730.

The burst demodulation field portion 208 of the servo data is demodulated by the burst demodulator 110 during step 750 to fine position the read head to be on track. The Repeatable Runout (RRO) data field is processed during step 760, in a known manner. Generally, the RRO data field (not shown in FIG. 2) includes head positioning information that is more precise than that provided by the encoded Gray data field and coarser than that provided by the burst demodulation field 216.

As shown in FIG. 7, the exemplary technique 700 employs a SAM2SAM calculator 705 that comprises a selection circuit 710 and a SAM2SAM distance estimator 720. In the embodiment of FIG. 7, the plurality of fine phase estimates selected by the selection circuit 710 comprise a ZPS Phase estimate, as well as a SAM Found Phase. The ZPS Phase estimate is computed by the coarse estimation 730 and has more resolution but is error prone in the presence of frequency errors. Likewise, as noted above, the SAM Found Phase estimate has lower resolution but is more resilient in the presence of frequency errors. As discussed further below in a section entitled "SAM Found Phase," the SAM Found Phase provides sub-T resolution and is more robust to frequency errors. Generally, the SAM Found Phase can be based on the teachings of U.S. Pat. No. 7,082,005, incorporated by reference herein, where the fine phase estimate is based on the phase selected by the interpolator 310. In the embodiment of FIG. 7, the selection criteria employed by the selection circuit 710 is whether the frequency error exceeds a predefined threshold.

The SAM2SAM distance estimator 720 can be implemented in a similar manner to the conventional approach of FIG. 4.

SAM Found Phase

As previously indicated, the SAM Found Phase provides sub-T resolution and is more robust to frequency errors. Generally, the SAM Found Phase can be based on the teachings of U.S. Pat. No. 7,082,005, incorporated by reference herein, where the fine phase estimate is based on the phase selected by the interpolator 310. The exemplary operation of the interpolator 310 is discussed hereinafter in conjunction with FIGS. 8-10.

Figure 8:
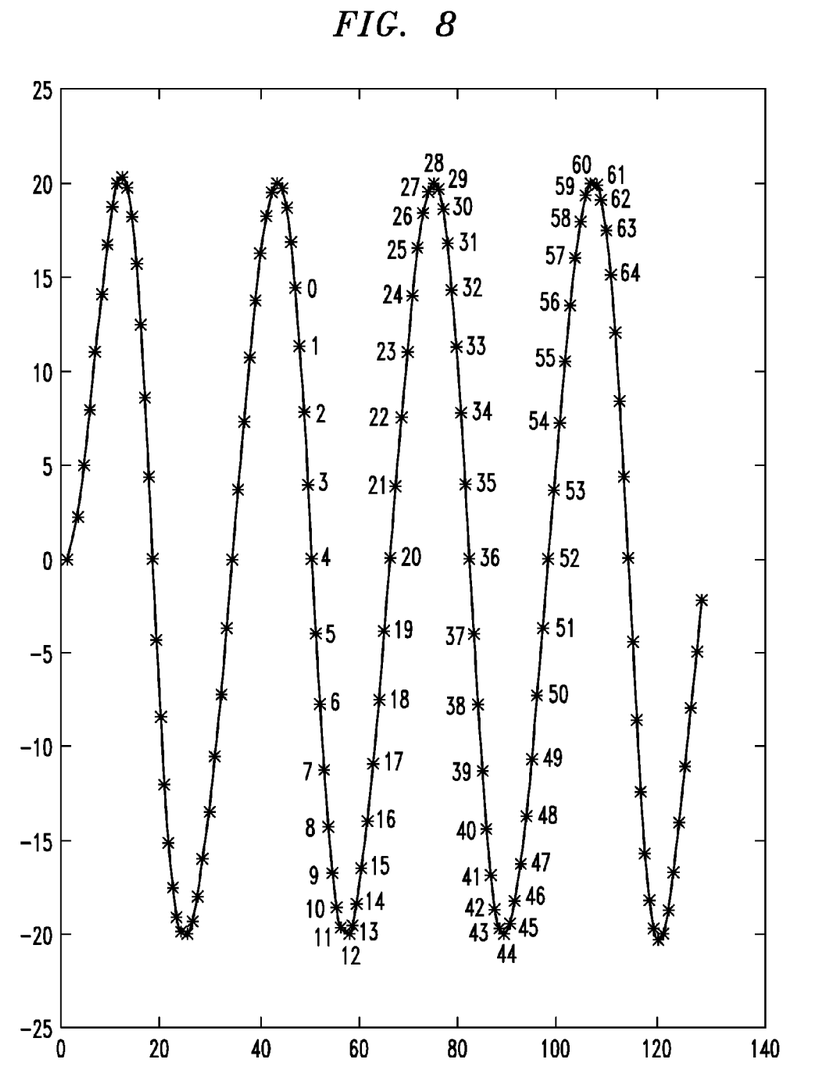
FIG. 8 is a diagram illustrating a signal interpolated according to an embodiment of the present invention.

FIG. 8 is a diagram illustrating a signal interpolated according to an embodiment of the present invention. More specifically, FIG. 8 shows an example of an interpolated 2T signal appearing at the output of the digital interpolator module 310 of FIG. 3. Seven digital interpolators are used in generating the signal represented in the figure. Samples and interpolated points are numbered for ease of explanation.

It is to be understood that the read side algorithm of the invention has to operate differently between preamble and servo data fields. This is because, as given in Table 1, it is known what the sample values ideally should be in the preamble field. This initial portion is termed as the "acquire" mode of the algorithm. After the acquire mode, SAM and Gray servo data is detected and decoded. This mode (after acquire) is termed the "tracking" mode.

Figure 9:
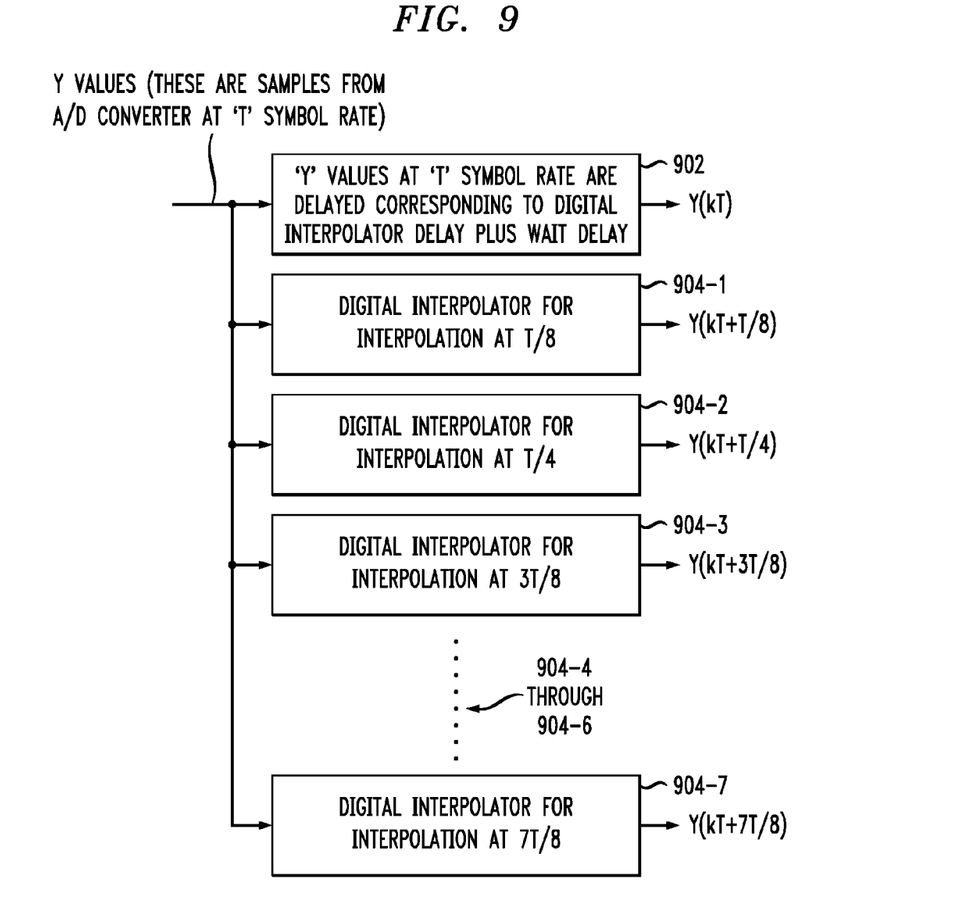
FIG. 9 is a flow diagram illustrating generation of interpolated values according to an embodiment of the present invention.

Referring now to FIG. 9, a flow diagram illustrates generation of interpolated values according to an embodiment of the present invention. More specifically, FIG. 9 shows how the 'Y' values out of the A/D converter 308 at 'T' rate are interpolated by digital interpolators 310 to obtain the intermediate values at 'I T/8' sampling instances for I=1, 2, 3, 4, 5, 6 and 7. In FIG. 9 and the following figures, Y(kT+I T/8) refers to the sample value at time instances kT+I T/8, where k=0, 1, 2, 3, . . . , and I=0, 1, 2, 3, 4, 5, 6 or 7. The T spaced sample values Y(kT) may be considered as the values coming out of the A/D converter with zero time shift relative to the interpolated values. Note that the algorithm requires only seven digital interpolators for T/8 resolution. These digital interpolators run at T rate. Hence, every T, an A/D sample and seven interpolated values are obtained.

Thus for every T, as shown in FIG. 9, the 'Y' value at T symbol rate is delayed in step 902 corresponding to a delay value associated with the digital interpolator module plus a wait delay to be explained below. Thus, step 902 yields Y(kT). Then, in steps 904-1 through 904-7, interpolated values Y(kT+T/8), Y(kT+T/4), Y(kT+3T/8), Y(kT+T/2), Y(kT+5T/8), Y(kT+3T/4) and Y(kT+7T/8) are respectively generated (904-4 through 904-6 are not expressly shown for the sake of simplicity of the flow diagram).

Consider FIG. 8 again to further clarify this operation. Assume samples "16," "24," "32" and "40" are received from the A/D converter. These are the 'Y' values at 'T' rate. These four A/D samples are passed through the seven digital interpolators (Table 3) to get the seven interpolated intermediate sample values "25" through "31." Note that "25" is T/8 apart from "24" and that "31" is 7T/8 apart from "24." Also note that to get the interpolated values "25" through "31," the system waits at least 2T after sample "24" is received from the A/D converter in order to get the rest of the samples "32" and "40" to pass them through the interpolators. This delay together with the digital interpolation filter implementation delay are used to line up the 'Y' values from the A/D converter to the interpolated values from the interpolators.

Figure 10:
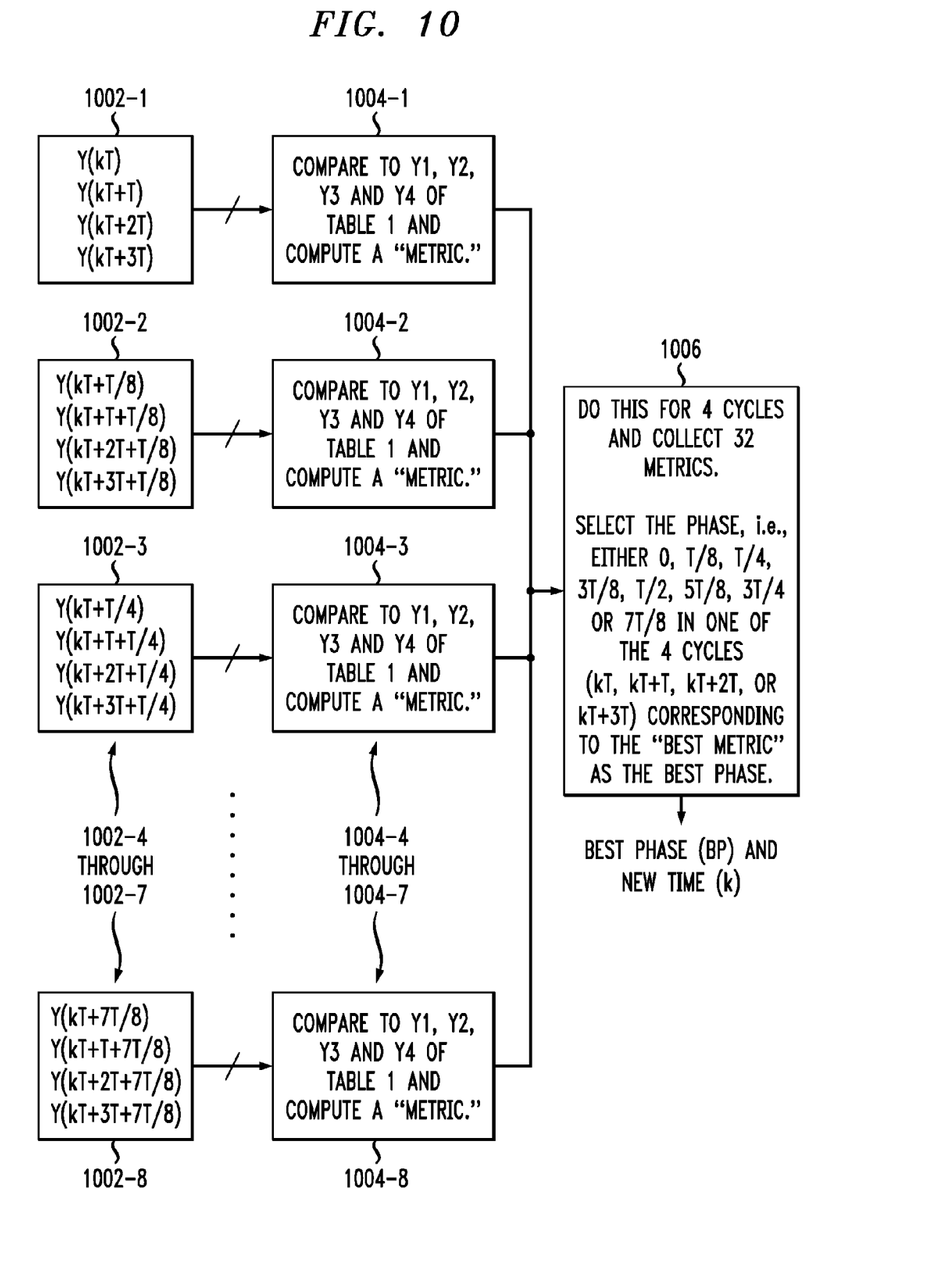
FIG. 10 is a flow diagram illustrating selection of an optimum phase in an acquire mode according to an embodiment of the present invention.

Referring now to FIG. 10, a flow diagram illustrates selection of an optimum phase (best phase) in an acquire mode according to an embodiment of the present invention. It is to be understood that data detector 312 (FIG. 3) preferably performs the various selection and tracking functions described herein. More specifically, FIG. 10 shows system operation during the initial portion of the acquire mode. First, the algorithm locks on to a best phase as follows. The algorithm works on the interpolated 2T field and tries to lock on to the phase corresponding to the desired 2T phase (say the phase corresponding to how the 2T pattern ends). For an EPR4 target response, as shown in Table 1, the phase corresponding to the preamble ending in 1100 results in [0 20 0 −20] as the ideal stream of values (Ideal Y values). For seven interpolators and an A/D sample, for example, any of the eight sub-phases in one of the 4T periods may be locked on to. Note that one of the interpolated sample phases may be selected as the best phase and that the phase corresponding to the sample from the A/D converter need not always be the best phase.

The invention is not limited to any particular locking technique. That is, locking metrics depend on the type of servo encoder and its constraints. One locking metric that may be employed comprises computing the sum of the absolute errors between samples and desired stream of values. The optimum or best metric in this case will be the minimum of those sums. Another locking metric that may be employed is peak value. Servo encoders may impose strong peaks at certain locations in the code word. Metrics for different phases (time instances) around the desired location can be the amplitudes of the samples at those locations (time instances). The optimum or best metric in this case would be the strongest peak.

As shown in FIG. 10, the algorithm compares (in steps 1004-1 through 1004-8, respectively) the four ideal 'Y' values (Y1, Y2, Y3 and Y4 of Table 1) to four 'Y' values from the A/D converter [Y(kT), Y(kT+T), Y(kT+2T) & Y(kT+3T)] (obtained in 1002-1) and also to seven sets of four time shifted 'Y' values from each of the seven digital interpolators [Y(kT+I T/8), Y(kT+T+I T/8), Y(kT+2T+I T/8) & Y(kT+3T+I T/8), I=1, 2, 3, . . . 7] (obtained in 1002-2 through 1002-8, respectively) and computes a metric for each phase (i.e., each time shift). Thus far, eight metrics are obtained. The operation is repeated for three more cycles (T) so as to obtain 24 (3×8) more metrics. The algorithm then finds the best metric of the 32 metrics, in step 1006. Then, the phase (i.e., either 0, T/8, T/4, 3T/8, T/2, 5T/8, 3T/4 or 7T/8) and the cycle time (i.e., either kT, kT+T, kT+2T or kT+3T) corresponding to the best metric is selected as the best phase (BP) (also referred to herein as the SAM Found Phase) and the reference time (k). As explained above, the criterion for selecting the best metric depends on the locking metric employed (e.g., sum of the absolute errors, peak value, etc.).

Note that in the notation used herein, 'k' is an integer representing different time instances. When the "next cycle" is referred to, this implies that k is incremented by 1. The algorithm may repeat the procedure outlined in FIG. 10 until consistent best phases are obtained, after which the algorithm moves on to tracking the best phase as shown in FIG. 11.

Figure 11:
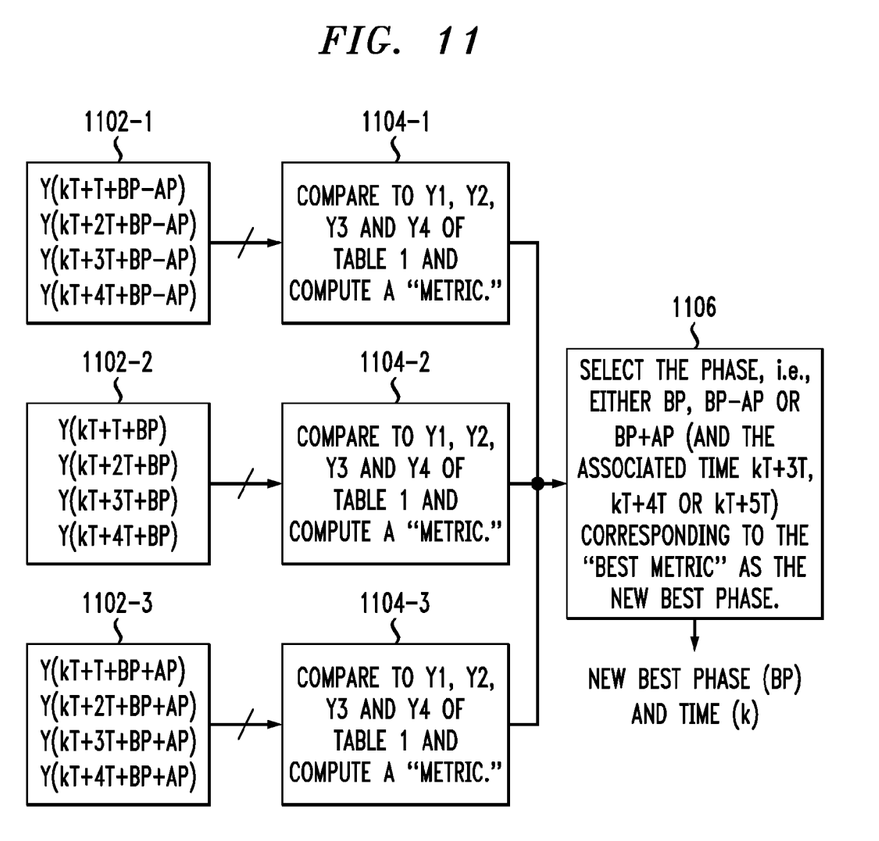
FIG. 11 is a flow diagram illustrating tracking of an optimum phase in an acquire mode according to an embodiment of the present invention.

Referring now to FIG. 11, a flow diagram illustrates tracking of an optimum phase in an acquire mode according to an embodiment of the present invention. In accordance with FIG. 11, the adjacent phase (AP) is defined as the phase adjacent to the best phase. Assume that the phase corresponding to T/8 apart from the best phase is taken as the adjacent phase. If 5T/8 is the best phase (BP), for example, then the adjacent phases would be 5T/8−T/8=4T/8 (BP−AP) and 5T/8+T/8=6T/8 (BP+AP).

Once the starting best phase (BP) and the reference time (k) are known, as determined in accordance with FIG. 10, the algorithm compares (step 1104-2) the four ideal 'Y' values (Y1, Y2, Y3 and Y4 of Table 1) to four samples corresponding to the best phase [Y(kT+T+BP), Y(kT+2T+BP), Y(kT+3T+BP) and Y(kT+4T+BP)] (obtained in 1102-2) and also compares (steps 1104-1 and 1104-3, respectively) the four ideal 'Y' values to four samples each corresponding to adjacent phases (AP) on either side of the best phase [Y(kT+T+BP+/−AP), Y(kT 2T+BP+/−AP), Y(kT+3T+BP+/−AP) and Y(kT+4T+BP+/−AP)] (obtained in 1102-1 and 1102-3). As before, metrics are also computed in steps 1104-1 through 1104-3, and a new best phase (BP) and a new starting reference time (k) are determined in step 1106.

For example, if the adjacent phase (AP) is T/8, the algorithm compares the four ideal 'Y' values (Y1, Y2, Y3 and Y4 of Table 1) to the samples corresponding to the best phase, and to the phases that are respectively correspondent to +/−T/8 apart from the best phase. As before, the phase (BP, BP+AP or BP−AP) and the associated time (kT+3T, kT+4T or kT+5T) corresponding to the best metric of these comparisons is taken as the new best phase (BP) and the new starting reference time (k) for the next set of comparisons. The next set of comparisons is done on samples corresponding to the new best phase and to the new best phase+/−adjacent phases.

Note that these comparisons usually take place every 4T intervals and sometimes 5T intervals during the acquire mode. This is because all of the samples needed to perform these comparisons will be available only after the time instant kT+4T+BP+AP. In the extreme case, for example, if BP=7T/8 and AP=T/8, then kT+4T+BP+AP=kT+4T+T=kT+5T, indicating that the sample corresponding to kT+4T+BP+AP will be available only after 5T from the reference time k.

Also note that the new reference time (k) corresponding to the new best phase will be either 3T, 4T or 5T intervals from the old reference time. Examples to further illustrate this point are given as follows. If BP−AP is selected as the new best phase and if BP=0 and AP=T/8, then kT+4T+BP−AP=kT+4T+0−T/8=kT+3T+7T/8. This indicates that the new reference time will be 3T from the old reference time and that the new best phase is 7T/8 in that time interval. If BP+AP is selected as the new best phase and if BP=7T/8 and AP=T/8, then kT+4T+BP+AP=kT+4T+7T/8+T/8=kT+4T+T=kT+5T+0. This indicates that the new reference time will be 5T from the old reference time and that the new best phase is 0 in that time interval. For all other cases of BP and AP, the new reference time will be 4T from the old reference time. In general, BP−AP<0 indicates that the new reference time is 3T from the old reference time, BP+AP T indicates that the new reference time is 5T from the old reference time, and other cases mean that the new reference time is 4T from the old reference time.

The algorithm needs to detect the end of preamble to find out when the 4T preamble ends and when the 8 bit code word (⅔ servo encoder) begins. The end of preamble can be easily detected by passing out the interpolated values and samples corresponding to the best phases and adjacent sub-phases to the same circuitry used in the system for detecting the end of preamble.

Once the end of preamble is detected, an approach similar to that illustrated in FIG. 11 is used to track the phase after the preamble field and to detect servo data, as discussed further in U.S. Pat. No. 7,082,005.

It is to be further understood that the functional elements of the read side of the magnetic recording system 300 in FIG. 3 may be implemented in accordance with a processor and associated memory. That is, one or more of the equalizer 306, the digital interpolators 310, the data detector 312, the burst demodulator 314 and the block decoder 316 may be implemented as such. The processor and memory may preferably be part of a digital signal processor (DSP) used to implement the read channel. However, it is to be understood that the term "processor" as used herein is generally intended to include one or more processing devices and/or other processing circuitry. For example, the invention may be implemented as an application-specific integrated circuit (ASIC) or as another type of integrated circuit, e.g., a read channel integrated circuit. The term "memory" as used herein is generally intended to include memory associated with the one or more processing devices and/or circuitry, such as, for example, RAM, ROM, a fixed and removable memory devices, etc.

Accordingly, software components including instructions or code for performing the methodologies of the invention, as described herein, may be stored in the memory associated with the read channel processor and, when ready to be utilized, loaded in part or in whole and executed by one or more of the processing devices and/or circuitry of the read channel processor.

Advantageously, as explained in detail herein, the invention provides substantial improvement in the performance associated with servo data detection under adverse radial incoherence (RI). The digital interpolation based methodologies of the invention do not stress the sampling circuitry since there is no need to oversample the raw analog signal. The invention may be applied to any servo encoded system (encoder-independent schemes), with appropriate modifications as dictated by the encoder code constraints. Given the inventive teachings provided herein, such modifications are well within the skill level of the ordinary artisan.

Also, the servo data detection techniques of the present invention improve seek time in magnetic recording systems. That is, since the techniques of the invention effectively provide mechanisms for overcoming the quick phase changes and signal loss associated with radial incoherence, faster disk seeks are possible. Also, tracks can be written closer and the disks can be spun faster with the application of techniques of the present invention. Moreover, the mis-synchronization to the block boundaries caused by RI that affects the performance of conventional servo SAM detection is advantageously overcome with the application of techniques of the present invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method for computing a distance between servo address marks (SAMs) in servo data of a magnetic recording media, comprising:
    obtaining a count of a number of time intervals between SAM patterns;
    obtaining a plurality of fractional phase estimates;
    selecting at least one of said plurality of fractional phase estimates as a selected fractional phase estimate based on a selection criteria; and
    combining said count and said selected fractional phase estimate to compute said distance.

2. The method of claim 1, wherein said plurality of fractional phase estimates comprises a first fractional phase estimate having a lower resolution and higher accuracy in the presence of frequency errors relative to a second fractional phase estimate and wherein said second fractional phase estimate has more resolution and lower accuracy in the presence of said frequency errors relative to said first fractional phase estimate.

3. The method of claim 1, wherein said plurality of fractional phase estimates comprises a settled phase of a Digital Phase Lock Loop (DPLL).

4. The method of claim 1, wherein said plurality of fractional phase estimates comprises a SAM Found phase value.

5. The method of claim 4, wherein said SAM Found phase value is based on a selected phase from a plurality of interpolated phases.

6. The method of claim 1, wherein said selection criteria comprises a frequency error threshold.

7. The method of claim 1, wherein said step of combining said count and said selected fractional phase estimate further comprises the step of adding said count and said selected fractional phase estimate.

8. A system for computing a distance between servo address marks (SAMs) in servo data of a magnetic recording media, the system comprising:
    at least one processor operative to:
    obtain a count of a number of time intervals between SAM patterns;
    obtain a plurality of fractional phase estimates;
    select at least one of said plurality of fractional phase estimates as a selected fractional phase estimate based on a selection criteria; and
    combine said count and said selected fractional phase estimate to compute said distance.

9. The system of claim 8, wherein said plurality of fractional phase estimates comprises a first fractional phase estimate having a lower resolution and higher accuracy in the presence of frequency errors relative to a second fractional phase estimate and wherein said second fractional phase estimate has more resolution and lower accuracy in the presence of said frequency errors relative to said first fractional phase estimate.

10. The system of claim 8, wherein said plurality of fractional phase estimates comprises a settled phase of a Digital Phase Lock Loop (DPLL).

11. The system of claim 8, wherein said plurality of fractional phase estimates comprises a SAM Found phase value.

12. The system of claim 11, wherein said SAM Found phase value is based on a selected phase from a plurality of interpolated phases.

13. The system of claim 8, wherein said selection criteria comprises a frequency error threshold.

14. The system of claim 8, wherein said count and said selected fractional phase estimate are combined by adding said count and said selected fractional phase estimate.

15. An integrated circuit for computing a distance between servo address marks (SAMs) in servo data of a magnetic recording media, the integrated circuit operative to perform operations comprising:
    obtaining a count of a number of time intervals between SAM patterns;
    obtaining a plurality of fractional phase estimates;
    selecting at least one of said plurality of fractional phase estimates as a selected fractional phase estimate based on a selection criteria; and
    combining said count and said selected fractional phase estimate to compute said distance.

16. The integrated circuit of claim 15, wherein said plurality of fractional phase estimates comprises a first fractional phase estimate having a lower resolution and higher accuracy in the presence of frequency errors relative to a second fractional phase estimate and wherein said second fractional phase estimate has more resolution and lower accuracy in the presence of said frequency errors relative to said first fractional phase estimate.

17. The integrated circuit of claim 15, wherein said plurality of fractional phase estimates comprises a settled phase of a Digital Phase Lock Loop (DPLL).

18. The integrated circuit of claim 15, wherein said plurality of fractional phase estimates comprises a SAM Found phase value.

19. The integrated circuit of claim 15, wherein said selection criteria comprises a frequency error threshold.

20. The integrated circuit of claim 15, wherein said step of combining said count and said selected fractional phase estimate further comprises the step of adding said count and said selected fractional phase estimate.

* * * * *